MICROWAVE FILTER UTILIZING TWO RESONANT RINGS AND HAVING TERMINALS PERMITTING USE TO BAND PASS OR BAND REJECT

Filed June 18, 1962 2 Sheets-Sheet 1

INVENTOR
JULIUS A. KAISER
BY S. J. Rotondi, A. J. Dupont &
J. D. Edgerton

INVENTOR
JULIUS A. KAISER
BY S. J. Rotondi, A. J. Dupont &
J. P. Edgerton

United States Patent Office 3,153,209

Patented Oct. 13, 1964

3,153,209

MICROWAVE FILTER UTILIZING TWO RESONANT RINGS AND HAVING TERMINALS PERMITTING USE TO BAND PASS OR BAND REJECT

Julius A. Kaiser, 10408 Detrick Ave., Kensington, Md.

Filed June 18, 1962, Ser. No. 203,407
6 Claims. (Cl. 333—73)
(Granted under Title 35, U.S. Code (1952), sec. 266)

The invention described herein may be manufactured and used by or for the Government of the United States of America for governmental purposes without the payment to me of any royalty thereon.

This invention relates to the field of microwave circuits and more particularly to filter networks.

Modern communication technology has expanded into ever higher frequency regions during the past two decades. New electronic applications such as pulse-modulated and Doppler CW radars require devices capable of generating and utilizing signals in the megacycle and gigacycle frequency regions. In order to obtain increased precision and resolution these devices must be capable of operating at still higher frequencies. The equipment most commonly used at these microwave frequencies are waveguides and transmission lines.

Microwave circuits must be capable of performing a variety of operations on electromagnetic signals. The types of operations which such circuits should be capable of performing are analogous to the capabilities of the lower frequency lumped-parameter circuits. One of these operations, and that one with which this invention is primarily concerned, is that of filtering. This includes both bandpass filters and band-rejection filters.

The prior microwave technology has performed these operations by means of such devices as cavity resonators and stub-tuned waveguides and transmission lines. These devices function effectively but, as is the case with all such waveguide and transmission line devices, are difficult to package efficiently and are relatively expensive since they must be manufactured to close tolerances.

It is therefore an object of this invention to suppress unwanted frequencies in microwave signals.

It is a further object of this invention to effect such suppression by means which occupy a minimum of space.

It is still another object of this invention to achieve such suppression utilizing means which can be manufactured at a relatively low cost.

These and other objects of this invention are achieved by means of a microstrip circuit having a unique geometry. The particular configuration of this circuit is such that between the input terminal and one output terminal the circuit exhibits the characteristics of a narrow band-rejection filter, and between the input terminal and a second output terminal the circuit exhibits the characteristics of a bandpass filter.

The achievement of the foregoing and other objects of this invention will become apparent from the following detailed description of specific embodiments of this invention in connection with the accompanying drawings in which.

Figure 1A:
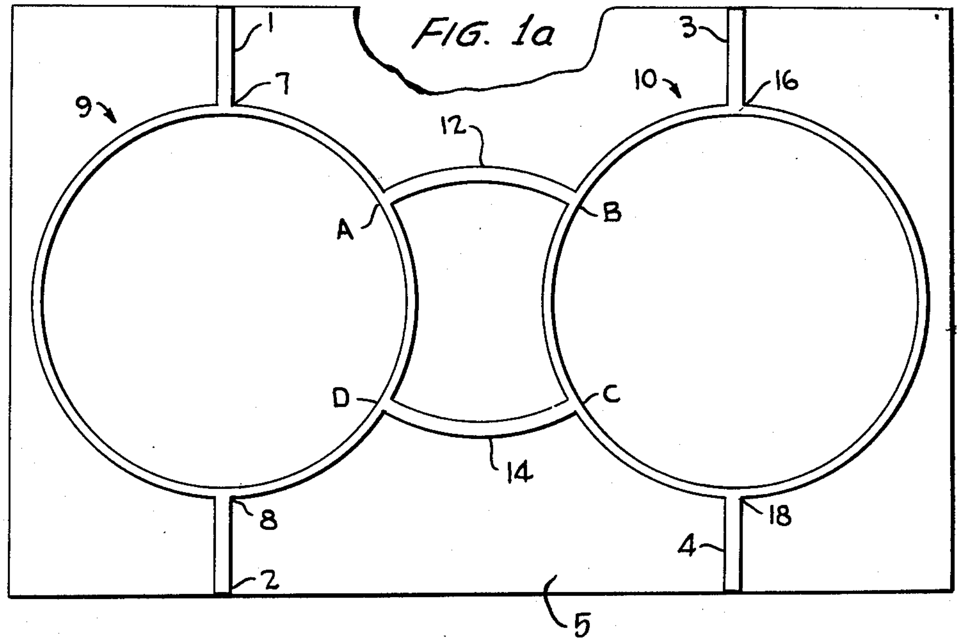
FIG. 1A is a plan view of the basic filter network constructed according to this invention.
Figure 1C:
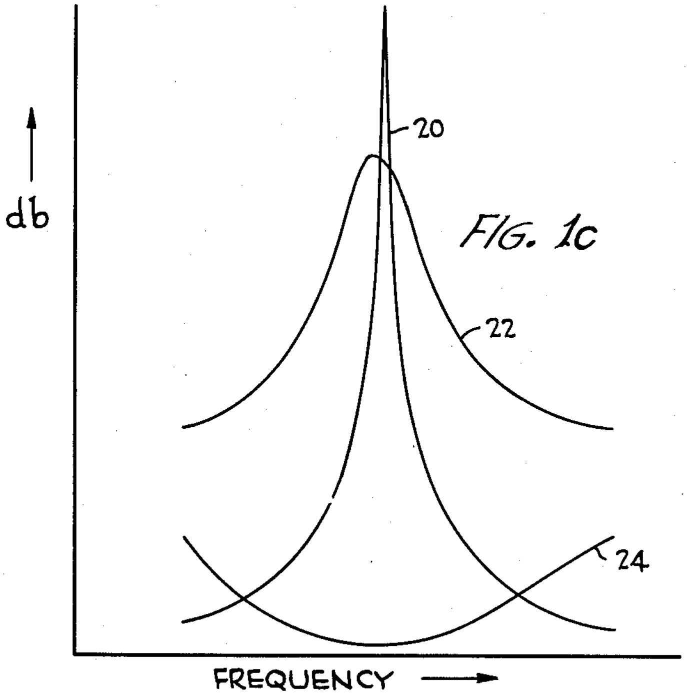
FIG. 1C shows an experimentally derived graph of the transfer characteristics of the circuit of FIG. 1A.
Figure 1B:
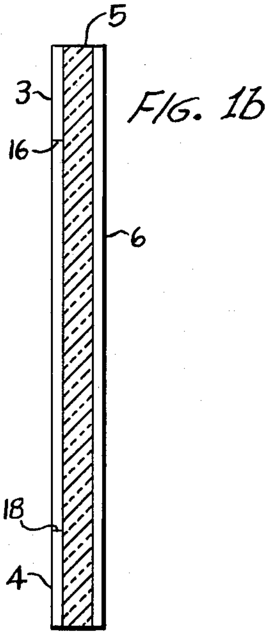
FIG. 1B is a side view of the filter network shown in FIG. 1A.

Turning now to FIGS. 1A and 1B, there is shown a plan view and a side view of a circuit of the preferred embodiment of this invention. The circuit shown in these figures is a printed microstrip version of the circuit. The circuit is printed on a sheet of dielectric material 5 such as Teflon fiberglass. The dielectric has a copper backing 6 which serves as a ground plane for the circuit. The basic filter circuit of FIG. 1A comprises a pair of closed circular conducting rings 9 and 10, each of which has a circumference equal to one and one-half times the signal wavelength at the center frequency of operation of the filter. Terminals 1 and 2 are connected to ring 9 at points 7 and 8, respectively, and terminals 3 and 4 are connected to ring 10 at terminals 16 and 18 respectively. Points 7 and 8 on ring 9 are diametrically opposite from each other, as are points 16 and 18 on ring 10. A one-quarter wavelength conducting strip 12 is connected between point A on ring 9 and point B on ring 10 and a second one-quarter wavelength conducting strip 14 is connected between point D on ring 9 and point C on ring 10. Points A, B, C and D are one-quarter wavelength away from points 7, 16, 18 and 8, respectively. The microstrip conductors 12 and 14 and the rings 9 and 10, in the preferred embodiment, have a characteristic impedance of 70 ohms, and the terminals 1, 2, 3 and 4 have characteristic impedances of 50 ohms.

When it is desired to operate the filter network of FIG. 1A as a narrow band-rejection filter, the input is inserted at terminal 1 and the output is taken at terminal 2, while terminals 3 and 4 are terminated with characteristic impedance co-axial terminations. When it is desired to operate this filter network as a bandpass filter, the input is inserted at terminal 1 and the output is produced at terminal 3. In this configuration terminals 2 and 4 are terminated by characteristic impedance terminations. The points A and D on 9 are one-quarter wavelength apart, and the points B and C on ring 10 are also one-quarter wavelength apart, so that the loop A, B, C, D, A is one wavelength long.

The theory of the operation of the circuit of FIG. 1A is not yet fully understood, so that it can only be explained empirically. Current entering arm 1 of the circuit tends to divide evenly into two portions at the point 7. Current tends to flow out of the ring 9 at points A and 8 in equal amounts, because the current flowing through the left side of ring 9 is in phase with the current flowing through the right side thereof at these points and is anti-phase at the point D. The current flowing into arm 12 at point A proceeds on to the point B on ring 10 where it again divides evenly, half of it tending to flow towards point C and half of it tending to flow towards point 16. Again, because of the length of the various portions of ring 10, these two halves are in phase at terminals 16 and C but are anti-phase at point 18. Therefore, half of the current flowing into ring 10 at point B tends to flow out at point C and the other half tends to flow out at point 16. The current flowing out of ring 10 at point C traverses conductor 14 and returns to ring 9 at point D. Part of this current flows on to point 8 where it arrives anti-phase with the current flowing from terminal 1 through the left hand side of ring 9, thus cancelling or reducing a portion of the current at terminal 8. The remainder of the current flowing into ring 9 at point D returns to point A where it arrives in phase with the current from point 7. Therefore, the current at point 8 tends to decrease while the current at point A tends to increase. Equilibrium is reached when the current at terminal 8 is completely cancelled and all of the current flowing into ring 9 at point 7 flows out at point A. Since there are only two possible points at which the current can leave ring 10, at points C and 16, and since the current leaving ring 10 at point C is fed back into the filter circuit, all of the current entering arm 1 of ring 9 must leave the circuit by arm 3 of ring 10.

As has been noted above, equilibrium in this circuit is achieved when the current at point 8 of ring 9 is zero. This result has been achieved experimentally, but it could also be deduced logically from the following considerations:

When a signal is initially inserted at terminal 1 of ring 9 it tends to flow out in equal amounts at terminals A and 8. The current flowing out at terminal A divides evenly between terminals 16 and C of ring 10. The current flowing out of ring 10 at point C flows back into ring 9 where half of it flows to point A and the other half flows to point 8. The current flowing to point 8 arrives antiphase with the current which flowed directly from terminal 1 to point 8, thus reducing the total current at point 8. The current flowing from point D to point A arrives at point A in phase with the current flowing directly from terminal 1, thus increasing the current flowing through arm 12. This increased current follows the same path through ring 10 where a portion of it is again recirculated through arm 14 to points 8 and A, thus further reducing the current at point 8 and further increasing the current at A. This process continues until the current at point 8 is zero and all of the current flowing into ring 9 at point 7 flows out at point A. Now, if the current flowing from point D to point 8 were to increase still further, the result would be a net flow of current at terminal 2, with a corresponding reduction in current at point A. This reduction would lead to a reduction in the current entering ring 9 at point D, thus reducing the net current at point 8, so that the condition of zero current at point 8 would be restored.

FIG. 1C shows a series of curves representing the transfer characteristics between various terminals of the filter of FIG. 1A. These curves represent the insertion loss in db versus frequency between different pairs of terminals. Thus, curve 20 represents the transfer characteristics between input terminal 1 and output terminal 2, curve 22 shows the characteristic between input terminal 1 and output terminal 4, while curve 24 shows the characteristic between input terminal 1 and output terminal 3. From these curves, it may be seen that with a signal inserted at terminal 1, the output signals appearing at terminals 2 and 4 represent the output of a band-rejection filter, while the signal appearing at terminal 3 represents the output of a bandpass filter. When any one of the terminals 2, 3, or 4 is utilized as the output terminal, the other two terminals are terminated by characteristic impedance terminations.

Figure 2A:
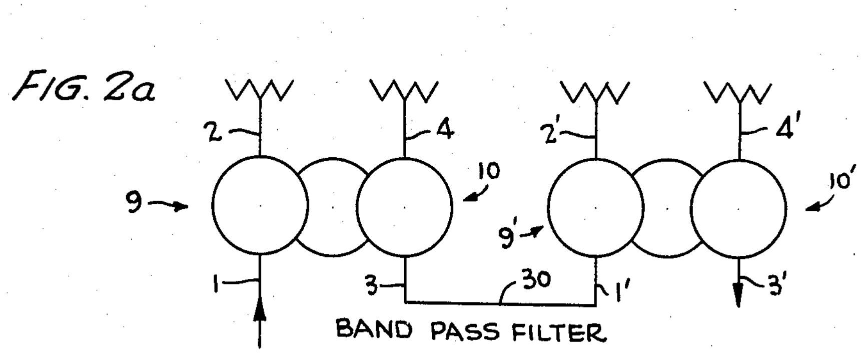
FIG. 2A is a schematic diagram of a bandpass filter constructed according to the present invention.

FIG. 2A illustrates another form of filter circuit according to the present invention. This is a bandpass filter utilizing two filter sections, each of which is identical to that of FIG. 1A. A signal is supplied to the input terminal 1 of the first filter, comprising rings 9 and 10. The output from terminal 3 of this filter, which is the bandpass output, is transmitted by conductor 30 to the input 1′ of the second filter, which is identical to the first filter and which comprises rings 9′ and 10′. The filtered output then appears at terminal 3′. Terminals 2, 4, 2′ and 4′ are terminated by characteristic impedances.

Figure 2B:
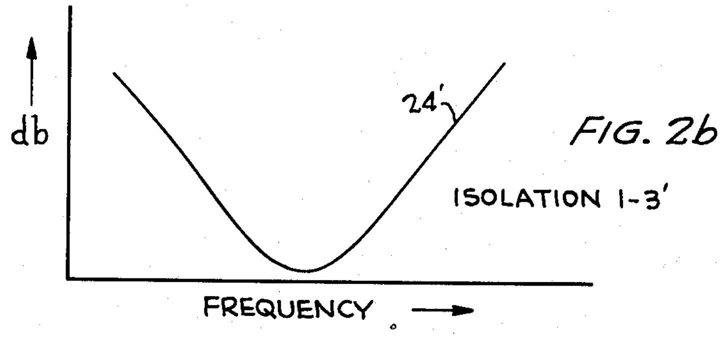
FIG. 2B is an experimentally derived graph of the transfer characteristic of the circuit of FIG. 2A.

FIG. 2B shows a graph of the transfer characteristic of the circuit of FIG. 2A. The curve 24′ represents the insertion loss of the circuit between terminals 1 and 3′ for a given range of frequencies. Inspection of FIG. 2B shows that the use of two filter networks produces a bandpass filter having a narrower bandwidth than a filter having only a single unit.

Figure 3B:
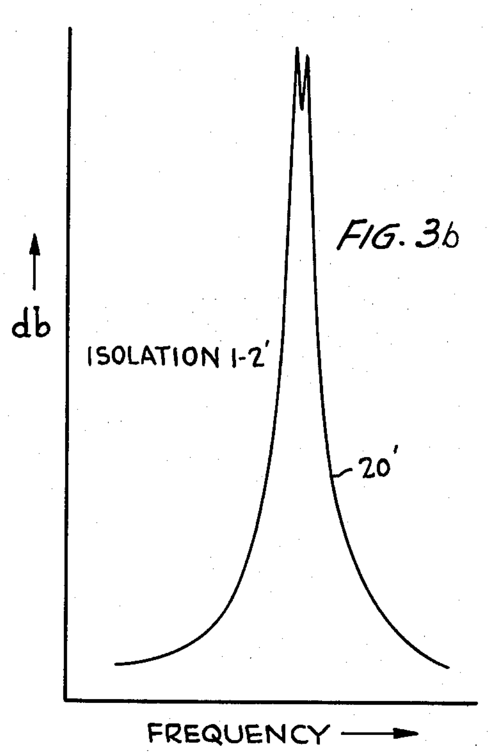
FIG. 3B is an experimentally derived graph of the transfer characteristic of the circuit of FIG. 3A.
Figure 3A:
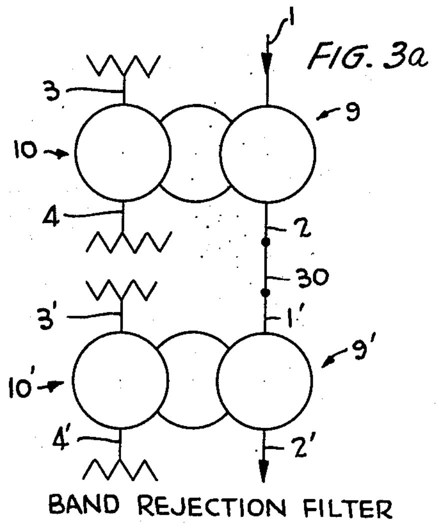
FIG. 3A is a schematic diagram of a band-rejection filter constructed according to the present invention.

FIG. 3A illustrates still another form which this invention may take, wherein a pair of filter units are connected so as to produce a band-rejection filter which is capable of producing a greater attenuation at the center rejection frequency than the filter of FIG. 1A. In FIG. 3A, a signal is inserted at terminal 1 of the first filter unit and the output appearing at terminal 2 is conducted by conductor 30 to input 1′ of the second filter unit. The output of the circuit is then taken from terminal 2′ of the second unit. The terminals 3, 4, 3′ and 4′ are terminated by their characteristic impedances.

FIG. 3B shows a curve of the characteristic of the circuit between terminals 1 and 2′. As may be seen, a very high isolation exists over a narrow frequency band surrounding the center rejection frequency. The double peaks of the curve 20′ are caused by constructing the two filters so as to have slightly different center rejection frequencies. It may thus be seen that by varying the center frequency differential betwen the two filters, a very accurate control of the bandwidth of the circuit of FIG. 3A may be achieved.

While only a few embodiments of this invention have been shown and described, it is obvious that many changes and modifications may be made without departing from the scope of the invention, and that many different configurations can be made with a plurality of units of the basic filter circuit of this invention without departing from the scope of the inventon. It is to be understood that the appended claims are intended to cover all such changes and modifications as fall within the true spirit and scope of this invention.

I claim as my invention:

1. A microwave filter having a fixed center frequency of operation comprising:

(*a*) a first circular ring conducting network having a circumference substantially equal to one and a half times the wavelength of a signal having a frequency equal to the center frequency of operation of the filter;

(*b*) a second circular ring conducting network identical in circumference to said first ring network;

(*c*) an input terminal connected to one point on said first conducting ring;

(*d*) a second terminal connected to said first conducting ring at a point diametrically opposite to the point at which said input terminal is connected;

(*e*) a third terminal connected to said second conducting ring;

(*f*) a fourth terminal connected to said second conducting ring at a point diametrically opposite to the point at which said third terminal is connected;

(*g*) a conducting strip having a length equal to one-quarter of the wavelength of a signal having a frequency equal to the center frequency of operation of the filter and having one end connected to said first ring at a point one-quarter of a wavelength away from said input terminal and its other end connected to said second conducting ring at a point one-quarter of a wavelength away from said third terminal; and (*h*) a second conducting strip having a length equal to one-quarter of the wavelength of a signal having a frequency equal to the center frequency of operation of said filter and having one end connected to said first ring at a point one-quarter of a wavelength away from said second terminal and its other end connected to said second ring at a point one-quarter of a wavelength away from said fourth terminal.

2. A device as recited in claim 1 further comprising a conducting ground plane which is spaced near said conducting elements and which is separated therefrom by a dielectric sheet.

3. A device as recited in claim 2 further comprising:

(*a*) a first characteristic impedance termination connected to said third terminal; and (*b*) a second characteristic impedance termination connected to said fourth terminal.

4. A microwave band-rejection filter comprising:

(*a*) a first filter as recited in claim 3;

(*b*) a second filter as recited in claim 3; and (*c*) a conductor connecting the second terminal of said first filter with the input terminal of said second filter.

5. A device as recited in claim 2 further comprising:

(*a*) a first characteristic impedance termination connected to said second terminal; and (*b*) a second characteristic impedance termination connected to said fourth terminal.

6. A microwave bandpass filter comprising a first filter as recited in claim 5 and a second filter as recited in claim 5, and a conductor connecting the third terminal of said first filter with the input terminal of said second filter.

References Cited in the file of this patent

UNITED STATES PATENTS

| | | |
|---|---|---|
| 2,749,521 | Englemann et al. | June 5, 1956 |
| 2,836,798 | Levine et al. | May 27, 1958 |
| 2,854,645 | Arditi | Sept. 30, 1958 |
| 2,874,276 | Dukes | Feb. 17, 1959 |
| 2,951,149 | Grieg et al. | Aug. 30, 1960 |
| 2,953,781 | Dounellan | Sept. 20, 1960 |
| 3,029,396 | Sichak | Apr. 10, 1962 |
| 3,074,033 | Smith | Jan. 15, 1963 |